(12) United States Patent
McRobert

(10) Patent No.: US 7,168,442 B1
(45) Date of Patent: Jan. 30, 2007

(54) LIQUID HANDLING SYSTEM

(76) Inventor: Ian McRobert, 148 Eleventh Road, Wungong, W.A. 6112 (AU)

( * ) Notice: Subject to any disclaimer, the term of this patent is extended or adjusted under 35 U.S.C. 154(b) by 308 days.

(21) Appl. No.: 10/343,791

(22) PCT Filed: Aug. 4, 2000

(86) PCT No.: PCT/AU00/00934

§ 371 (c)(1),
(2), (4) Date: Jun. 25, 2003

(87) PCT Pub. No.: WO01/10200

PCT Pub. Date: Feb. 15, 2001

(30) Foreign Application Priority Data

Aug. 5, 1999 (AU) .................................. PQ 2049

(51) Int. Cl.
*A01K 61/00* (2006.01)
*B67D 5/00* (2006.01)

(52) U.S. Cl. ............... 137/209; 137/256; 137/571; 119/224; 119/226

(58) Field of Classification Search ............... 137/206, 137/209, 256, 263, 266, 571; 119/224, 226; 405/59, 74
See application file for complete search history.

(56) References Cited

U.S. PATENT DOCUMENTS

| | | | |
|---|---|---|---|
| 2,059,927 A | * | 11/1936 | Beck ........................ 137/571 |
| 3,256,908 A | * | 6/1966 | Mann ........................ 137/571 |
| 3,876,119 A | | 4/1975 | Lamkin |
| 5,167,472 A | * | 12/1992 | Podd et al. ................. 406/145 |
| 5,540,521 A | | 7/1996 | Biggs |
| 5,979,362 A | | 11/1999 | McRobert |

FOREIGN PATENT DOCUMENTS

| | | | |
|---|---|---|---|
| WO | WO 98/29624 | * | 7/1998 |
| WO | WO 99/46981 | | 9/1999 |

* cited by examiner

Primary Examiner—John Rivell
(74) Attorney, Agent, or Firm—Burr & Brown

(57) ABSTRACT

A liquid handling system transfers liquid (e.g. water, bearing marine animals) between two tanks each having a respective liner which is movable between a lining position (when filled with liquid) and an inverted position (when its respective tank is emptied). In an initial state, liquid is held in a first tank. By supplying air to a space between the first tank and its liner, its liner is progressively lifted and liquid passes along a channel onto the initially inverted second liner (which acts as a baffle to slow the liquid flow). Air in a space between the second liner and the second tank is vented so transferred liquid sinks the second liner to fill the second tank. A ballast liquid may be used in the spaces. Initially held in the second tank, the ballast liquid flows via a passage into the first tank as transfer of liquid progresses.

10 Claims, 4 Drawing Sheets

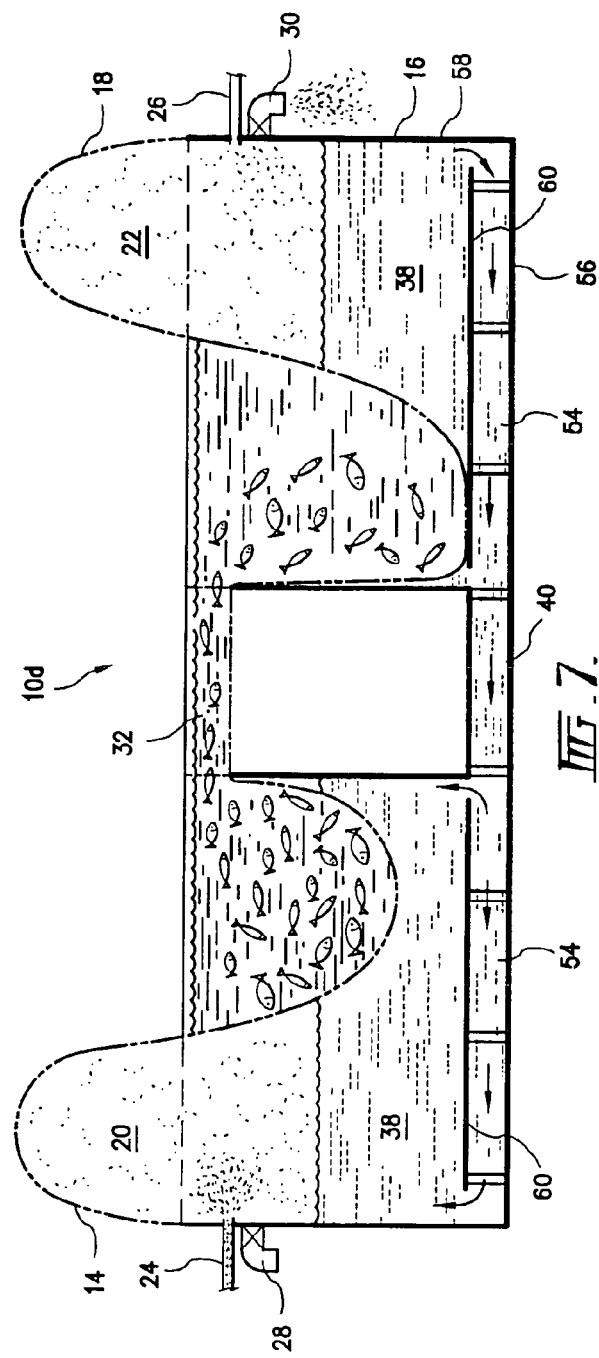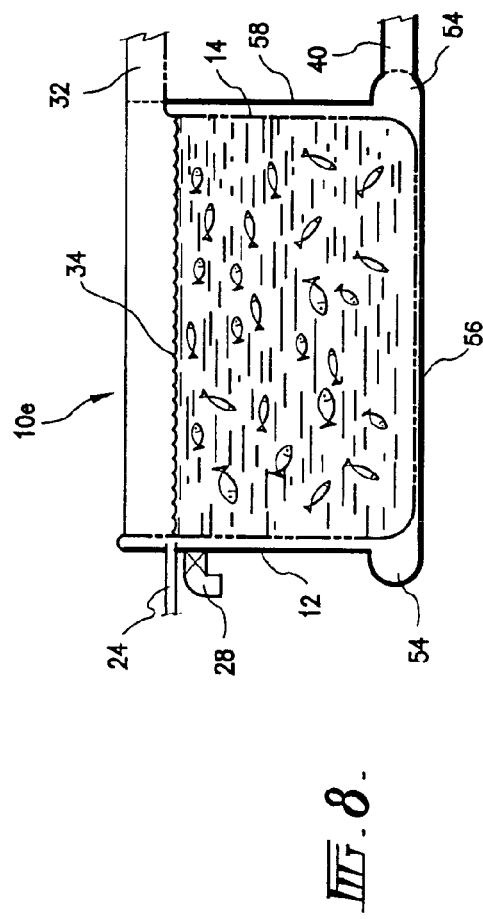

LIQUID HANDLING SYSTEM

FIELD OF THE INVENTION

The present invention relates to a liquid handling system particularly, but not exclusively, suited to transferring liquid between a plurality of receptacles.

BACKGROUND OF THE INVENTION

In land based aquaculture systems there is often a need to transfer marine animals from one tank or receptacle to another. This may be done for grading purposes or to allow cleaning of, and removal of waste products and debris from, a tank. For example in the harvesting of crustacean larvae, the larvae must be regularly shifted from tank to tank to allow cleaning. At present, this is performed by manually transferring the larvae by a pipette to a holding vessel. The larvae are particularly stress sensitive and it is common for a large proportion to die during this procedure. On the other hand, if the larvae are not transferred, to allow cleaning of the tank and removal of waste products, significant proportions will die due to water pollution. The greater the time between successive cleanings of the tank the greater the proportion of larvae that die. Liquid handling is also important in water treatment plants, refineries and mineral processing plants. In many instances, it is important not only that liquid be transferred but that it be transferred in a controlled manner with relatively low flow rates to prevent mixing or stirring of any particles or other matter held within the liquid.

SUMMARY OF THE INVENTION

The present invention was developed with a view to providing a liquid handling system that can facilitate a controlled flow rate transfer of liquid between receptacles or tanks with minimal mixing or turbulence.

According to the present invention there is provided a liquid handling system including at least:
- a first receptacle provided with a first liner;
- a second receptacle provided with a second liner, each liner being movable between a lining position in which it lines its corresponding receptacle and an inverted position in which it covers its corresponding receptacle;
- a first region being defined between the first receptacle and the first liner; and, a second region being defined between the second receptacle and the second liner;
- a first gas vent for venting gas from the first region to the atmosphere;
- a second gas vent for venting gas from the second region to the atmosphere; and,
- a first fluid communication path between the first and second receptacles;
- said system having an initial state where said first liner is in the lining position and said second liner is in the inverted position;
- whereby, in use, liquid in said first receptacle is transferred to said second receptacle by opening said second gas vent and supplying a gas to the first region thereby progressively moving the first liner toward the inverted position and displacing the liquid to flow through the first path onto the second liner, the flow of liquid being baffled by the second liner, and where the weight of the liquid flowing onto the second liner progressively moves the second liner toward the lining position.

Preferably said system further includes a fluid ballast held in the second region when the system is in this initial state.

In one embodiment said fluid ballast is a gas. Most preferably said gas is air.

In an alternate embodiment, said fluid ballast is a liquid ballast and said system further includes a second path providing fluid communication between the first and second regions, whereby, in use, as said liquid is being transferred from the first receptacle to the second receptacle via said first path, said ballast liquid is transferred through the second path from said second region to said first region. In this embodiment the system advantageously further includes a valve to control the flow of said ballast liquid through said second path.

Preferably said valve is automatically opened when the system is in use transferring liquid from one receptacle to the other receptacle via said first path.

Preferably said system further includes first and second vent valves associated with said first and second vents respectively for controlling the rate of venting of gas from said first and second regions to said atmosphere.

Advantageously, said system also includes a pump to assist in transferring said ballast liquid between said first and second regions through said second path.

Preferably each of said first and second receptacles has a base and a side wall extending upwardly from said base, and a liquid ballast return channel formed on or about said base and in fluid communication with said second path.

In one embodiment, each of said first and second receptacles is provided with a false bottom spaced above said base of said receptacle and said liquid ballast return channel is formed between said false bottom and said base. In an alternate embodiment, said liquid ballast return channel is formed as an annular recess about a junction where said side wall meets said base.

Preferably said first receptacle is one of a plurality of first receptacles each having a respective first liner, and a plurality of first fluid communication paths, each first path providing fluid communication between respective first receptacles and the second receptacle, so that the second receptacle is common to all of the first receptacles;
  whereby, in use, liquid held in any one of the first receptacles can be transferred to the second receptacle through a corresponding first fluid path by supplying a gas to the first region of the first receptacle thereby progressively moving the first liner of that receptacle towards the inverted position and displacing the liquid to flow through the corresponding first path onto the second liner, the flow of liquid being baffled by the second liner, and the weight of the liquid progressively moving the second liner towards the lining position.

BRIEF DESCRIPTION OF THE DRAWINGS

Embodiments of the present invention will now be described by way of example only with reference to the accompanying drawings in which:

FIG. 7 is a schematic representation of a fifth embodiment of the present invention; and FIG. 8 is a schematic representation of a sixth embodiment of the present invention.

DETAILED DESCRIPTION OF THE
PREFERRED EMBODIMENTS

Figure 1:
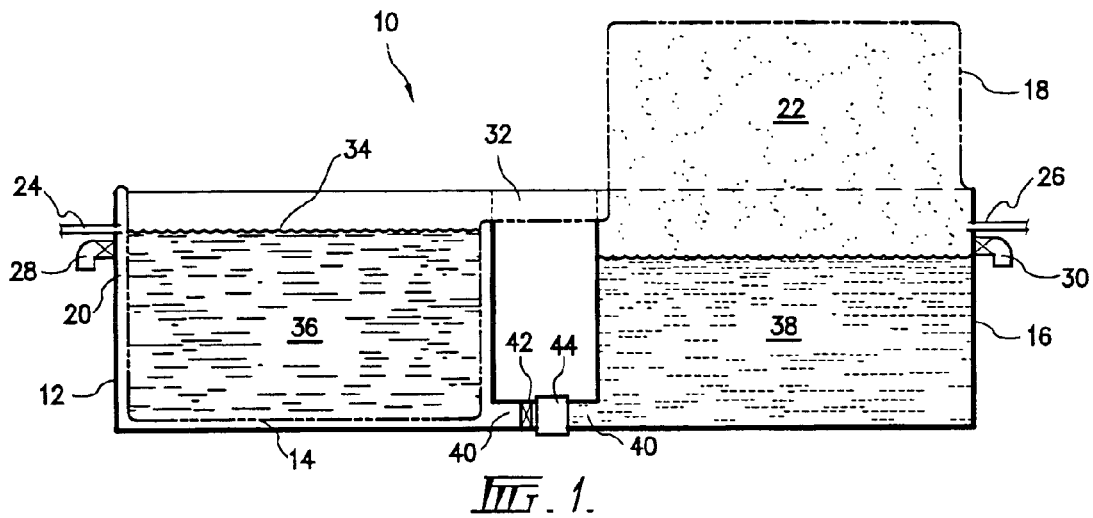
FIG. 1 is a schematic representation of a first embodiment of the liquid handling system when in an initial state.
Figure 2:
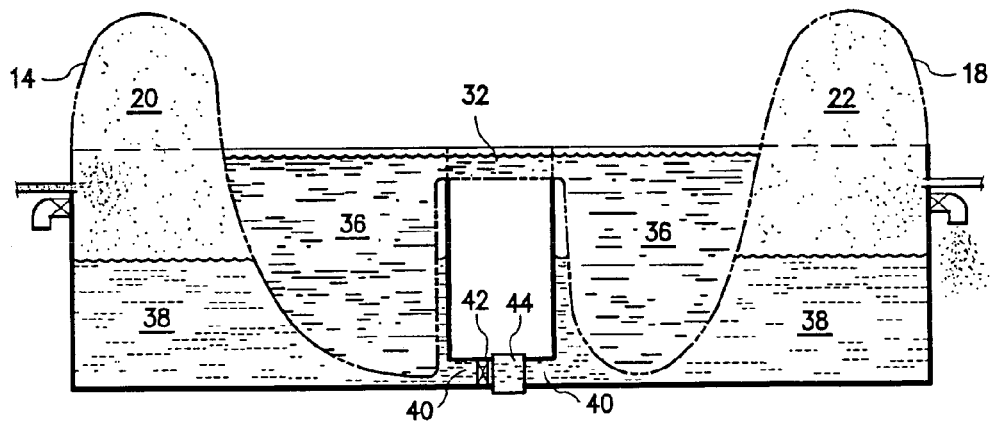
FIG. 2 is a representation of the system shown in FIG. 1 when in a transitional state.
Figure 3:
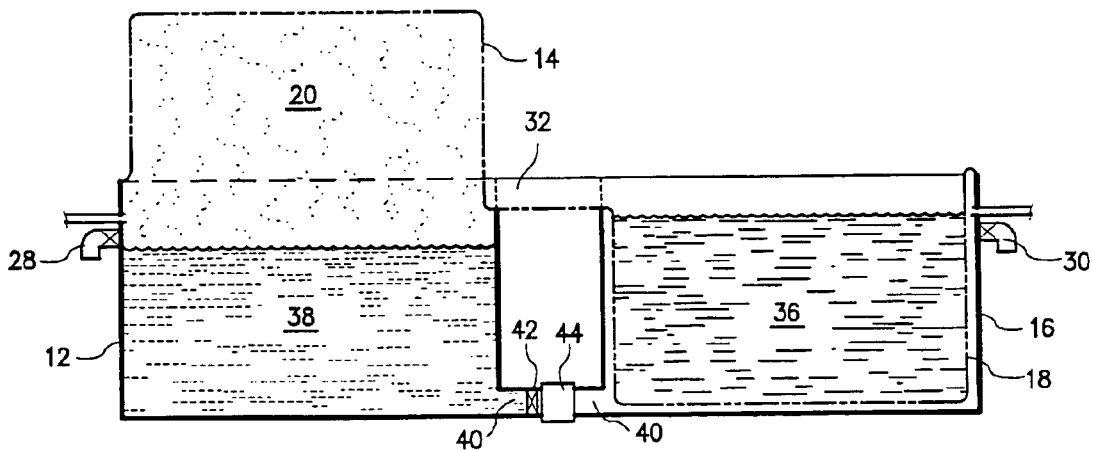
FIG. 3 is a schematic representation of the system shown in FIGS. 1 and 2 after the completion of a liquid transfer.

With reference to FIGS. 1–3 of the accompanying drawings, the liquid handling system 10 comprises a first receptacle in the form of tank 12 provided with a first liner 14 (represented in phantom line) and a second receptacle or tank 16 provided with a second liner 18. Each liner 14,18 is moveable between a lining position in which it lines its corresponding tank and an inverted position in which it covers its corresponding tank.

With reference to FIG. 1, the liner 14 is in the lining position while the liner 18 is in the inverted position. A gas (eg air) supply means (not shown) is used in conjunction with the system 10 for supplying a gas, typically air to a first region 20 between the first tank 12 and first liner 14 and also for supplying air to a second region 22 between the second tank 16 and second liner 18. The first and second regions 20,22 are the regions between the inside surface of the tanks 12,16 and the adjacent surface of corresponding liners 14,18. The air supply means typically would be connected with a conduit 24 attached to the first tank 12 to supply air to the first region 20 and a conduit 26 attached to tank 16 to provide air to the second region 22.

A first gas/air vent 28 is provided in the first tank 12 to vent air from the first region 20 to the atmosphere and a further gas/air vent 30 is provided in the second tank 16 to selectively vent air from the second region 22 to the atmosphere. A first fluid communication path in the form of channel 32 provides fluid communication between the first tank 12 and second tank 16. As explained in greater detail below, when a liner is in the inverted position, it acts as a baffle to the flow of water through the channel 32.

The system 10 has an initial state depicted in FIG. 1, where the first liner 14 is in the lining position and the second liner 18 is in the inverted position. In this embodiment, the tank 12 is filled to a level 34 which is below the channel 32 with water containing larvae 36. In order to transfer the water containing the larvae 36 from tank 12 to tank 16 the air vent 30 is opened, vent 28 closed and the air supply means operated to supply air to the first region 20 via the conduit 24. The air entering the region 20 progressively lifts the liner 14 toward the inverted position as shown in FIG. 2. The progressive lifting of the liner 14 in turn displaces the water containing the larvae 36 to flow through the channel 32 onto the inverted liner 18. As seen most clearly in FIG. 1, because the liner 18 is initially in the inverted position, it extends across the adjacent end of channel 32 to effectively act as a baffle to the flow of water through the channel 32. In this way, the water passing through channel 32 from tank 12 to tank 16 flows with a relatively slow flow rate. Additionally, the water as it exits the channel 32 does not fall any substantial distance onto the liner 18 into tank 16. Accordingly there is negligible turbulence or mixing of the water as it is transferred to the tank 16. The weight of the water flowing through channel 32 onto liner 18 progressively sinks or lowers the liner 18 toward the lining position. When the transfer of water from tank 12 to tank 16 is completed, the first liner 14 assumes the inverted position and the second liner 18 assumes the lining position as depicted in FIG. 3.

The first liner 14 is maintained in the inverted position by keeping vent 28 closed. The exposed surface of the liner 14 can now be cleaned prior to returning it to its lining position. To return the liners 14 and 18 back to their lining and inverted positions respectively as shown in FIG. 1, the above process is simply reversed so that air is supplied to the region 22 by a conduit 26, vent 30 is closed, and the air vent 28 is opened.

Each of the air vents 28 and 30 can be provided with an associated vent valve (not shown) for controlling the rate of venting of gas from regions 20 and 22 respectively. This facilitates precise control of the rate of return of the liner initially in the inverted position as well as control of the depth of water in the channel 32. Indeed, it allows the liners to be held or frozen in any particular position during a transfer cycle of liquid from one receptacle to the other.

The liners 14,18 are attached to their respective tanks 12,16 along an upper circumferential edge (viewed when the liners are in the lining position). A portion of the edge adjacent the channel 32 is attached to the tank marginally below the channel 32. Advantageously the edge is disposed in an inclined plane with its lowest end located adjacent, and marginally below, channel 32.

In the embodiment shown in FIGS. 1–3, the system includes a volume or body of ballast liquid 38 which, when the system is in its initial state, is held in the second tank 16 beneath the liner 18, ie in the second region 22. Also provided is a second communication path 40 providing fluid communication between the first and second regions 20,22. A valve 42 and two way pump 44 are provided in the second path 40. When the liquid containing the larvae 36 is being transferred from tank 12 to tank 16 the valve 42 is opened to allow the liquid ballast 38 to flow from the second tank 16 to the first tank 12. This can occur by way of a natural gravity feed if the pump 44 is either not operated or not provided. A gravity feed occurs by virtue of the fluid containing the larvae 36 effectively displacing the ballast 38 to flow through the second path 40. Advantageously the volume of liquid ballast 38 is less than the volume of liquid in tank 12 when the system 10 is in its initial state. This ensures that when the liquid is completely transferred it fully displaces all the ballast liquid and firmly holds the liner in the lining position.

The liquid ballast 38 may be provided with the purpose of further "cushioning" the transfer of the water containing the larvae 36 between the tanks 12,16 or for providing temperature stabilisation of the liquid within the entire system 10. It is important to note however that the ballast liquid 38 never comes into contact with the liquid containing the larvae 36.

Figure 4:
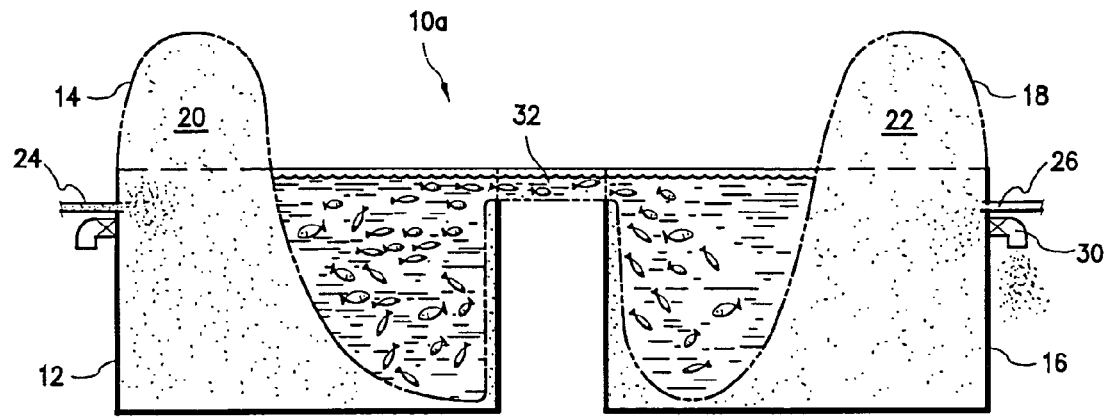
FIG. 4 is a schematic representation of a second embodiment of the system when in a transitional state.

The provision of the ballast liquid 38 is optional. In the second embodiment of the system 10a depicted in FIG. 4 in which like reference numbers denote like features, the system 10 contains no ballast liquid. Rather, with the system 10a in its initial state, the region 22 is simply filled completely with a gas such as air. In the event that the system 10a does not require or use the liquid ballast 38 then additionally it will not require the second path 40, valve 42 and pump 44. In the system 10a fish are contained within the water being transferred between tanks 12 and 16. If the initial state of the system 10a is with the liner 14 in the lining position and the liner 18 in the inverted position so that the tank 12 contains the water holding the fish, the water and fish are transferred to the tank 16 by supplying air to the region 20 displacing the water to flow through channel 32 onto liner 18. With the air vent 30 open, the liner 18 progressively sinks toward the lining position as the water and fish are transferred. The inverted liner 14 can be then cleaned. Thereafter the process can be reversed to return the water and fish back to tank 12.

Figure 5:
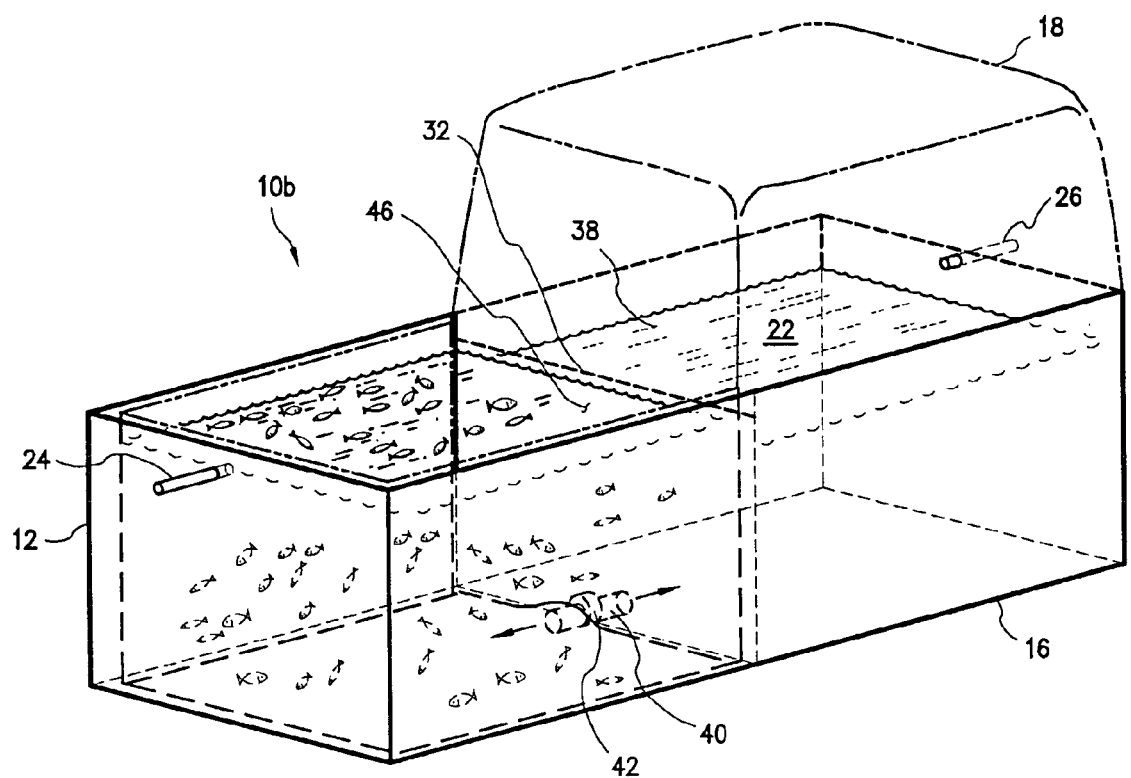
FIG. 5 is a representation of a third embodiment of the present invention.

A further embodiment of the system 10b is depicted in FIG. 5. Here, the first and second tanks 12,16 are back to back and separated by a planar wall 46. The first fluid communication path 32 in this embodiment is constituted by the top of the wall 46. This in effect forms a spillway for the transfer of liquid from tank 12 to tank 16. In this embodiment, a ballast liquid 38 is initially provided in the region 22 between the inverted liner 18 and in the receptacle 16. The tank 12 holds a volume of water containing fish.

During the transfer of this water with the fish to tank 16, the ballast liquid passes to the region 20 via second communication path 40 being formed in the wall 46. A valve 42 can be placed in the path 40 to open the path 40 when a transfer of liquid is occurring. The liners 14 and 18 are raised and lowered by use of air in the same manner as described in relation to the earlier embodiments 10 and 10a.

Figure 6:
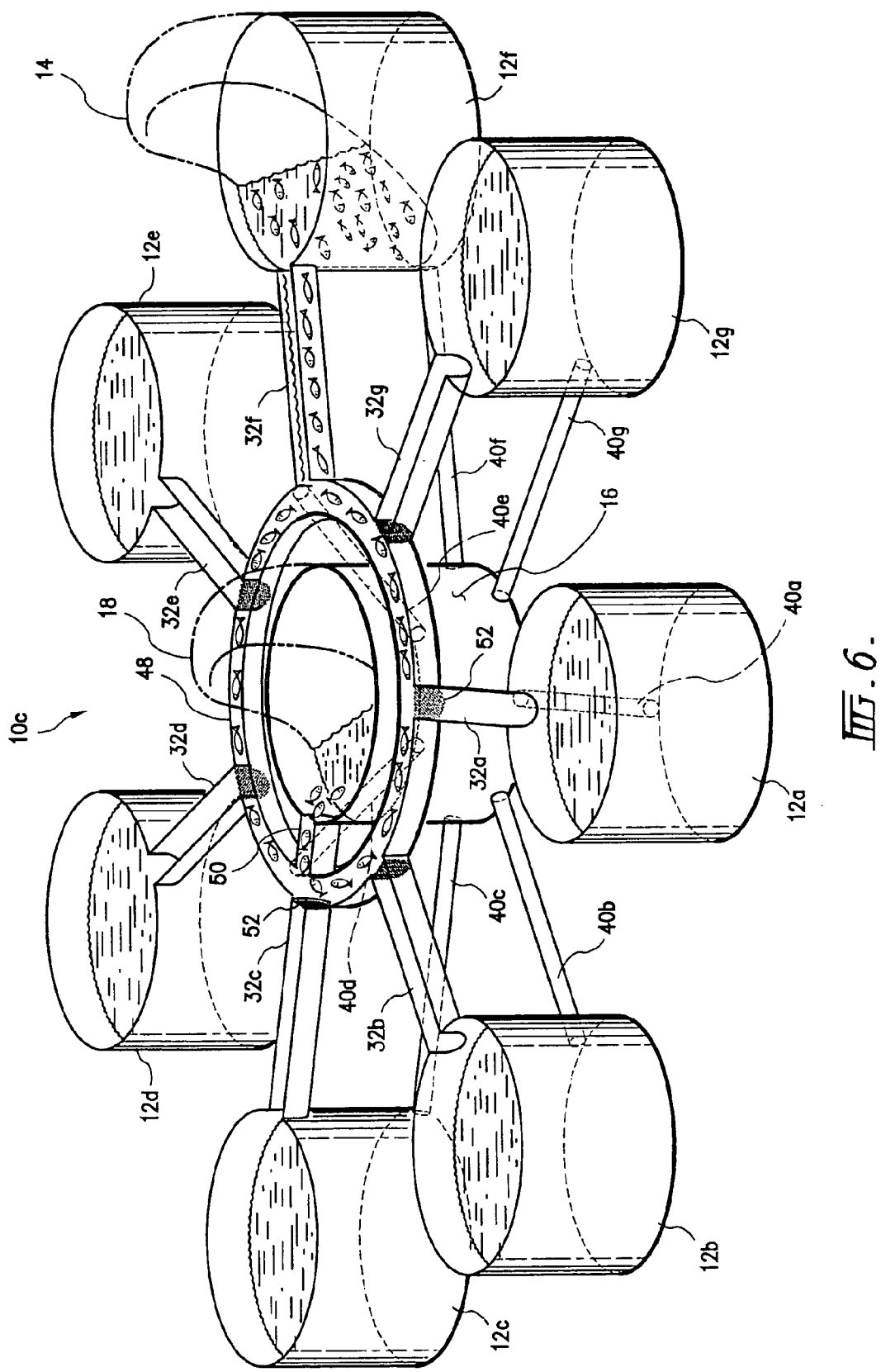
FIG. 6 is a schematic representation of a fourth embodiment of the present invention.

FIG. 6 illustrates yet a further embodiment of the system 10c comprising seven first tanks 12a–12g disposed about a common second tank 16. In this configuration the second tank 16 acts as a central transfer or holding tank for each of the first tanks 12a–12g. Respective channels 32a–32g provide fluid communication between their respective tanks 12a–12g and the second tank 16 via a roundabout channel 48. Each of the channels 32a–32g is in fluid communication with the roundabout channel 48. The roundabout channel 48 is in turn in fluid communication with the tank 16 via link channel 50. In order to prevent the water from one of the first tanks 12a–12g being directed to another one of the first tanks during a liquid transfer a gate 52 is placed at the end of each channel 32a–32g adjacent the roundabout channel 48. Most advantageous, these gates would be automatically controlled in order to control the correct channelling of water between the first tanks 12a–12g and second tank 16.

The system 10c also includes a plurality of second channels 40a–40g to allow the transfer of a ballast liquid (not shown) between the second tank 16 and the particular one of the first tanks 12a–12g whose liquid is being transferred to and from the second tank 16. Again, a set of gates (not shown) will be placed at the end of each of the second channels 40a–40g to ensure that the ballast liquid is diverted along the appropriate channels. The structure and operation of the first tanks 12a–12g and the second tank 16 is identical to that described with reference to the system 10 depicted in FIGS. 1–3.

In a variation, the system 10c' can be operated without ballast liquid, in which case the second channels 40a–40g and associated gates, valves, pumps will be omitted.

FIG. 7 depicts a further embodiment of the system 10d which differs in substance from the embodiment 10 depicted in FIGS. 1–3 by the inclusion of a liquid ballast return channel 54 in both of the tanks 12, 16 each of which is in fluid communication with the second channel 40. The liquid ballast return channels 54 provide a path of minimal resistance for flow of the ballast liquid 38 between the tanks during a transfer cycle. Each tank 12, 16 has a base 56 and a side wall 58 extending upwardly from the base 56. The liquid ballast return channel 54 is formed at the bottom of each tank 12, 16 on or about the base 56. In the system 10d, the channel 54 is formed by providing a false bottom 60 parallel to and spaced above the base 56. The false bottom 60 can take many different forms such as a plate provided with a plurality of holes or slots; a grid; or a plurality of longitudinally extending and laterally spaced apart beams. The false bottom 60 supports the corresponding line of 14, 18 above the base 56 when the liner is in the lining position. Consider for example the system 10 depicted in FIG. 1. In that system as it is represented, where a transfer cycle commences, the ballast water 38 passes through the channel 40 and enters the tank 12 beneath the liner 14 and against the weight of the liquid held by the liner 14. With a liquid ballast return channel 54 installed in the tank 12 the liquid ballast has a less resistive path into the tank 12.

FIG. 8 depicts a tank 12 of a further system 10e having a liquid ballast return channel 54' of alternate configuration. In this embodiment, the liquid ballast return channel 54' is in the form of an annular recess formed in the side wall 54 of tank 12 in the region of the junction between the side wall 58 and the base 56.

Now that embodiments of this invention have been described in detail it will be apparent to those skilled in the relevant arts that numerous modifications and variations may be made without departing from the basic inventive concepts. For example while the embodiments are described with specific reference to aquaculture, embodiments of the system can be used in numerous other fields such as in settling tanks in order of processing or treatment plants, in refineries and chemical plants, and in mineral processing lines. The liners 14,18 can be made from any impervious flexible material such as rubber, PVC or other plastics material. Also, while the tanks 12,16 as shown as being circular in form they can take any shape.

All such modifications and variations are deemed to be within the scope of the present invention the nature of which is to be determined from the above description and the appended claims.

The invention claimed is:

1. A liquid handling system comprising:
   a first receptacle provided with a first liner that is movable between a lining position, in which it lines the first receptacle, and an inverted position, in which it covers the first receptacle;
   a second receptacle provided with a second liner that is movable between a lining position, in which it lines the second receptacle, and an inverted position, in which it covers the second receptacle;
   a first region defined between the first receptacle and the first liner, the first region being in fluid communication with a first gas vent for venting gas from the first region;
   a second region defined between the second receptacle and the second liner, the second region being in fluid communication with a second gas vent for venting gas from the second region;
   a first fluid communication path between the first and second receptacles for transferring liquid between the first receptacle and the second receptacle;
   a gas supply that selectively supplies gas to either (a) the first region to move the first liner towards the inverted position such that liquid within the first receptacle can be transferred to the second receptacle through the first fluid communication path; or (b) the second region to move the second liner towards the inverted position such that liquid within the second receptacle can be transferred to the first receptacle through the first fluid communication path; and
   a liquid ballast flowable between the first and second regions through a second fluid communication path in a direction opposite to a direction of flow of the liquid between the first and second receptacles.

2. The system according to claim 1 further including a pump to assist in transferring said ballast liquid between said first and second regions through said second path.

3. The system according to claim 1 further comprising first and second vent valves associated with said first and second vents respectively for controlling the rate of venting of gas from said first and second regions to said atmosphere.

4. The system according to claim 3 wherein each of said first and second receptacles has a base and a side wall extending upwardly from said base, and a liquid ballast return channel formed on or about said base and in fluid communication with said second fluid communication path.

5. The system according to claim 4 wherein each of said fist and second receptacles is provided with a false bottom spaced above said base of said receptacle and said liquid ballast return channel is formed between said false bottom and said base.

6. The system according to claim 5 wherein said liquid ballast return channel is formed as an annular recess about a junction where said side wall meets said base.

7. The system according to claim 4 further comprising a ballast valve to control the flow of said liquid ballast through said second fluid communication path.

8. The system according to claim 7 wherein said ballast valve is automatically opened when the system is in use transferring liquid from one receptacle to the other receptacle via said first fluid communication path.

9. The system according to claim 1 wherein said first receptacle is one of a plurality of first receptacles each having a respective first liner, and a plurality of first fluid communication paths, each first path providing fluid communication between respective first receptacles and the second receptacle, so that the second receptacle is common to all of the first receptacles;

wherein liquid held in any one of the first receptacles can be transferred to the second receptacle through a corresponding first fluid path by supplying a gas to the first region of the first receptacle thereby progressively moving the first liner of that receptacle towards the inverted position and displacing the liquid to flow through the corresponding first path onto the second liner, the flow of liquid being baffled by the second liner, and the weight of the liquid progressively moving the second liner towards the lining position.

10. A method for transferring marine animals held in a volume of water from a first receptacle to a second receptacle, the method comprising:

providing a first liner having an upper surface and a lower surface in the first receptacle;

sealing an edge of the first liner about and to the first receptacle;

providing a second liner having an upper surface and a lower surface in the second receptacle;

sealing an edge of the second liner about and to the second receptacle;

providing a first fluid communication path between the first receptacle and the second receptacle, the first fluid flow communication path being at a level above a normal water level within any one of the first and second receptacles;

providing a first vent between the first receptacle and the lower surface of the first liner;

providing a second fluid communication path between the first receptacle and the second receptacle;

providing a second vent between the second receptacle and the lower surface of the second liner;

placing the volume of water in which the marine animals are held in the first receptacle and on the upper surface of the first liner wherein the lower surface of the first liner contacts and lines the first receptacle;

supplying a gas between the lower surface of the second liner and the second receptacle to place the second liner in an inverted position in which it covers the second receptacle;

providing a liquid ballast in the second receptacle beneath the lower surface of the second liner;

thereafter transferring the volume of water and marine animals from the first receptacle to the second receptacle by closing the first vent, opening the second vent, supplying a gas between the lower surface of the first liner and the first receptacle to cause the lower surface of the fist liner to lift from the first receptacle and elevate the volume of water to above the fluid flow communication path wherein the volume of water in which the marine animals are held flows through the first fluid communication path into the second receptacle and onto the upper surface of the second liner wherein the second liner sinks to a lining position where the lower surface of the second liner contacts the second receptacle and displaces the liquid ballast to flow through the second fluid communication path into the first receptacle beneath the lower surface of the first liner.

* * * * *

UNITED STATES PATENT AND TRADEMARK OFFICE
CERTIFICATE OF CORRECTION

| | | |
|---|---|---|
| PATENT NO. | : 7,168,442 B1 | Page 1 of 1 |
| APPLICATION NO. | : 10/343791 | |
| DATED | : January 30, 2007 | |
| INVENTOR(S) | : Ian McRobert | |

It is certified that error appears in the above-identified patent and that said Letters Patent is hereby corrected as shown below:

Column 7
    *Line 14*: please change "fist" to --first--

Column 8
    *Line 33*: please change "fist" to --first--

Signed and Sealed this

Third Day of April, 2007

JON W. DUDAS
*Director of the United States Patent and Trademark Office*